UNITED STATES PATENT OFFICE.

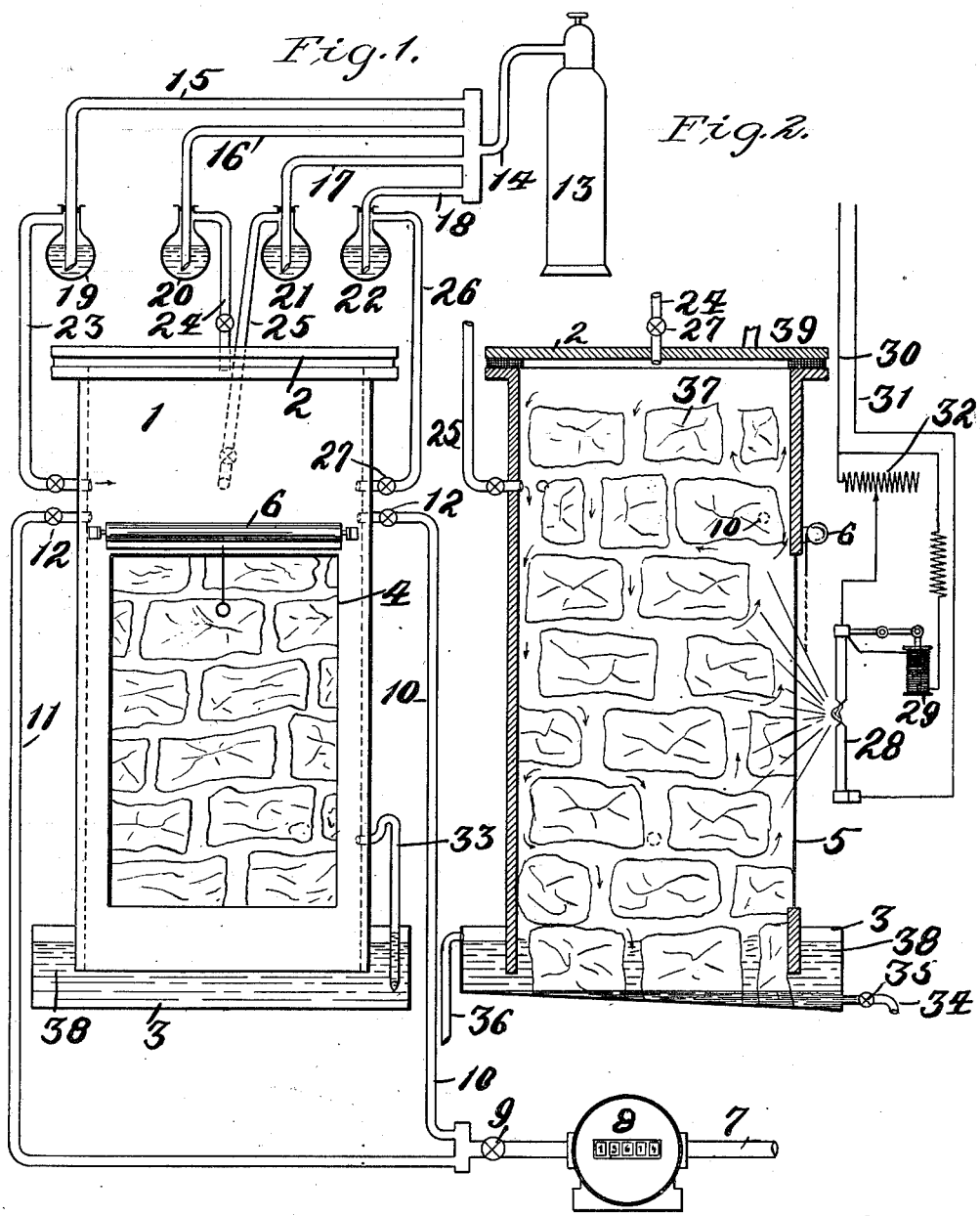

CLAYTON W. BEDFORD, OF TALLMADGE TOWNSHIP, SUMMIT COUNTY, OHIO, ASSIGNOR TO THE GOODYEAR TIRE AND RUBBER COMPANY, OF AKRON, OHIO, A CORPORATION OF OHIO.

HALOGENATION OF GASEOUS HYDROCARBONS OF THE PARAFFIN SERIES OF ALIPHATIC HYDROCARBONS AND THEIR HALOGEN DERIVATIVES.

1,245,553.  Specification of Letters Patent.  Patented Nov. 6, 1917.

Application filed June 29, 1914. Serial No. 847,937.

*To all whom it may concern:*

Be it known that I, CLAYTON W. BEDFORD, a citizen of the United States, residing at Tallmadge township, in the county of Summit and State of Ohio, have invented new and useful Improvements in Halogenation of Gaseous Hydrocarbons of the Paraffin Series of Aliphatic Hydrocarbons and Their Halogen Derivatives, of which the following is a specification.

This invention relates to new and improved methods for the halogenation of gaseous hydrocarbons of the paraffin series of aliphatic hydrocarbons and their halogen derivatives.

Schloremmer (*Annalen*, vol. 150, page 217), Phillips (*Am. Chem. Jour.*, vol. 16, page 362) and others have stated that the halogen, chlorin, reacts very slowly with hydrocarbons at low temperature, and at a higher temperature the reaction proceeds too violently, giving undesirable products. Phillips, (*loc. cit.*), states that in the chlorination of methane there is continuously formed either the monochlorid (methyl chlorid) or the tetra-chlorid (carbon tetrachlorid) and concludes that the two intervening chlorids (methylene chlorid and chloroform) are formed only in small amounts. In all literature or patents to date, no means has been found for successfully regulating the chlorination of methane and thereby obtaining the lower chlorids in large quantities with the prevention of the formation of the highest chlorid.

I have now found that by the use of an agent directly in contact with the mixture of gas and halogen during the reaction, this agent serving the double purpose of cooling and of removing the hydrochloric acid gas as fast as it is formed, the temperature may be maintained low enough to condense out the lower chlorids before they are chlorinated beyond the desired point. I have found that each of the four chlorids of methane, form in turn, and in amounts relative to the amount of the preceding chlorid or hydrocarbon which is present in the mixture and amenable to the action of chlorin.

I have found that if the temperature is properly maintained, either methylene chlorid or chloroform may be condensed out before being further chlorinated. I have found that if the temperature is properly controlled, methyl chlorid may be formed without the formation of much of the higher chlorids. I have found that the reaction between chlorin and methane, ethane, methyl chlorid, etc., will take place easily and rapidly with ice directly and intimately in contact with the gas mixture, the reaction taking place in the interstices between the ice cakes and hydrochloric acid gas being removed as fast as formed. Either with ice in the reaction chamber or by spraying, splashing, dripping, or in some way bringing water or water containing products of the reaction in solution, in direct and intimate contact with the reaction mixture, during exposure to actinic light of sufficient strength, the di-chlorid and the tri-chlorid (methylene chlorid and chloroform) may be easily condensed out without the formation of the tetra-chlorid (carbon tetrachlorid) in appreciable quantities. I have found that with ice or water directly in intimate contact with the reacting gases, the mono-chlorid (methyl chlorid) may be formed without the formation of the higher chlorids, provided too much chlorin is not added before the methyl chlorid first formed is removed from the unchanged hydrocarbon.

I have found that the heat of reaction of chlorin with hydrocarbons or with their chlorin derivatives is so great that the temperature of gas reactions can only be properly controlled by placing an agent, that serves both for cooling and for removing hydrochloric acid gas, directly and intimately in contact with the reacting gases during the reaction. I have found that successful and continuous removal of hydrochloric acid gas from the reaction mixture as fast as it is formed is a great factor in speeding the reaction, in controlling the temperature by diminishing the volume of gases that need cooling, and in controlling the formation of the desired product. I have found that even finely cracked ice entirely filling the reaction chamber will not prevent the reaction between chlorin and natural gas, methane, ethane, methyl chlorid, etc., the heat of reaction being so great that the temperature of the gases in the spaces between the ice cakes rises to the temperature of easy reaction. I have found that ice, water, or water vapor directly and intimately in contact with the entire reacting gas mixture in no way hinders the reaction and otherwise than cooling, is a great aid to the reaction by mixing the gases and removing the hydrochloric acid gas as fast as it is formed. I have found that by regulating the size of the ice cakes, and thereby regulating the temperature that can attain in the interstices, I can satisfactorily control the kind and amount of different chlorids formed, and the same temperature control is obtained when using water as the cooling agent by regulating the temperature, amount or efficiency of contact of the water with the gases.

I have found that in all of the above discoveries the ultra-violet light is not necessary, the visible spectrum, especially the blue end of the same, being more than sufficient. I do not, however, restrict myself to the use of any definite kind of light. It may be here stated that an arc light using the so-called "photographic carbons" giving light rich in actinic (blue) rays, has been found most satisfactory.

This invention can also be used for the control of the reaction between hydrogen and chlorin for the production of hydrochloric acid. It can also apply to the reaction between chlorin and any other gas such as carbon dioxid, carbon monoxid, etc.

In carrying out my improved process I make use of certain mechanical instrumentalities, a preferred form of which is shown in the accompanying drawing in which the apparatus is shown diagrammatically.

In the drawings in which similar reference numerals indicate like parts in the different figures, Figure 1, is a view in front elevation; and, Fig. 2, is a view partly in side elevation and partly in section.

Referring to the drawings, the reference numeral 1 denotes a receptacle constituting a reaction chamber provided with a closure member 2 at its upper end and with the lower end thereof open and dipping in a receiving pan 3. One face of the receptacle or reaction chamber is provided with an opening closed by means of a pane 5 of transparent material. Positioned above the opening 4 is a curtain 6 which may be lowered to exclude light from the opening. The gaseous hydrocarbons are taken from a supply pipe 7 provided with a meter 8, and valves 9 are passed by branches 10 and 11 opening into the reaction chamber preferably on opposite sides thereof. The branches 10 and 11 are preferably provided with valves 12. The chlorin for use is taken from a supply tank 13 provided with an outlet pipe 14 preferably provided with branches 15, 16, 17 and 18. The lower ends of these branches 15–18 are adapted to dip in flasks 19, 20, 21 and 22 respectively. These flasks are provided with water below the upper surface of which the lower ends of the pipes 15–18 depend. The flasks 19–22 inclusive are provided with pipes 23, 24, 25 and 26 respectively and all connecting with the interior of the reaction chamber 1. These pipes 23–26 are preferably arranged so that the pipes 23 and 26 enter the reaction chamber on opposite sides thereof and the pipe 24 preferably enters through the closure device and the pipe 25 enters the reaction chamber at one side to form a more perfect distribution of the gas. The pipes 23–26 inclusive are provided with valves 27. In front of the pane 5 of transparent material is placed an arc lamp 28 provided with a carbon-operating coil 29 receiving current by wire 30 which connects with one carbon and the opposite carbon is connected with a wire 31. In the wire 30 is a shunt coil 32 for varying the amperage for changing the character of the light. The lower portion of the reaction chamber is provided with a transparent sight glass 33 for observing the height of the liquid in the chamber and the pan 3 is provided with a drainage pipe 34 controlled by a valve 35 and is further provided with an overflow 36. The reaction chamber is preferably filled with ice cakes 37 and a quantity of water 38 is placed in the pan 3. The reaction chamber is further provided with an exhaust pipe 39.

The process consists in first filling the reaction chamber 1 with ice 37 and partially filling the pan 3 with water. The air in the reaction chamber is exhausted through suitable means connected with the pipe 39. The vacuum thus produced causes the water to fill the spaces between the ice cakes and then methane or natural gas is admitted through the pipes 10 and 11 and chlorin is admitted through the pipes 23–26. These gases may be admitted singly or together, as desired. The entrance of the gases allows the water to subside and the spaces between the ice cakes become filled with a gaseous mixture. By exposing the interior of the reaction chamber to a sufficiently intense and actinic light, such as that from an arc, using "photographic carbons", the reaction begins at once. The volume expands slightly, due to the evolution of the heat. More chlorin is passed on the side opposite to the light until enough methyl chlorid has been formed to begin to give appreciable amounts of the next higher chlorid, which is a liquid at the temperature of ice. The volume then begins to contract and chlorin may be run in until all the gas is chlorinated or gas and chlorin run in until all the ice is melted. The methylene chlorid and chlorin can be seen condensing on the ice and running down and collecting under the confining water. With finely cracked ice, slower chlorination takes place and keeping the chamber full of ice, almost the entire product is methylene chlorid. With faster chlorination and a higher average temperature in the gases the reaction product is approximately half methylene chlorid and half chloroform. The methylene chlorid can be chlorinated to chloroform if desired. By chlorinating slowly only up to the point where the right amount of chlorin has been absorbed and removing the gases from the chamber, they are found to contain high percentages of methylene chlorid which may be removed and unchanged hydrocarbons returned to the reaction chamber.

In case that the ice melts and the upper level thereof gets below the upper part of the opening 4 so as to permit the rays of light to reach the gases without passing through the ice, the shade or curtain 6 is lowered sufficiently to prevent this occurrence. The desired product drains into the pan 3 and is drawn off for use through the pipe 34 after opening the valve 33.

As another example of carrying out my improved process it may be stated that by confining methane or natural gas in a chamber over water and spraying water throughout the gas mixture during the reaction, results corresponding to the above may be attained. The composition of the product will depend on the temperature of the water, on the percentage of hydrochloric acid in solution and on the efficiency of contact between the water and the gases during the reaction. With warm or hot water of the right temperature a product may be obtained that is almost entirely carbon tetrachlorid as far as the methane derivatives are concerned. With water near 0° C. the same results can be obtained as with the use of ice. Since the cooling water is used over and over, any dissolved materials are returned to the reaction chamber. When saturated with hydrochloric acid, the water is replaced by fresh water.

I claim:

1. In the process of halogenating gaseous saturated aliphatic compounds free from substituents other than halogens, inducing reaction of said compound and a halogen in gaseous state while in direct and intimate contact with a combined cooling and halogen acid removing agent.

2. In the process of halogenating gaseous, saturated aliphatic compounds free from substituents other than halogens, inducing reaction between said compound and a halogen in gaseous state while in direct and intimate contact with a combined cooling and halogen acid removing agent at a temperature sufficiently low to limit the degree of halogenation and to remove halogenated products by condensation thereof.

3. In the process of halogenating gaseous, saturated aliphatic compounds free from substituents other than halogen, inducing reaction between said compound and a halogen in gaseous state while in direct and intimate contact with a halogen acid removing agent at approximately 0 degrees C.

4. In the process of halogenating gaseous, saturated aliphatic compounds free from substituents other than halogen, inducing reaction between said compound and a halogen in gaseous state while in direct and intimate contact with aqueous material at approximately 0 degrees C.

5. In the process of halogenating gaseous, saturated aliphatic compounds free from substituents other than halogens, inducing reaction between said compound and a halogen in gaseous state while in direct and intimate contact with ice.

6. In the process of halogenating gaseous, saturated aliphatic hydrocarbons, inducing reaction between said hydrocarbon and a halogen in gaseous state while in direct and intimate contact with a combined cooling and halogen acid removing agent.

7. In the process of halogenating gaseous, saturated aliphatic hydrocarbons, inducing reaction between said hydrocarbon and a halogen in gaseous state while in direct and intimate contact with a cooling and halogen acid removing agent at a temperature sufficiently low to limit the degree of halogenation and to remove halogenated products by condensation thereof.

8. In the process of halogenating gaseous, saturated aliphatic hydrocarbons, inducing reaction between said hydrocarbon and a halogen in gaseous state while in direct and intimate contact with a halogen acid removing agent at approximately 0 degrees C.

9. In the process of halogenating gaseous, saturated aliphatic hydrocarbons, inducing reaction between said hydrocarbon and a halogen in gaseous state while in direct and intimate contact with aqueous material at approximately 0 degrees C.

10. In the process of halogenating gaseous, saturated aliphatic hydrocarbons, inducing reaction between said hydrocarbon and a halogen in gaseous state while in direct and intimate contact with ice.

11. In the process of halogenating methane, inducing reaction between the methane and a halogen in gaseous state while in direct and intimate contact with a combined cooling and halogen acid removing agent.

12. In the process of halogenating methane, inducing reaction between the methane and a halogen in gaseous state while in direct and intimate contact with a combined cooling and halogen acid removing agent at a temperature sufficiently low to limit the degree of halogenation and to remove halogenated products by condensation thereof.

13. In the process of halogenating methane, inducing reaction between the methane and a halogen in gaseous state while in direct and intimate contact with a halogen acid removing agent at approximately 0 degrees C.

14. In the process of halogenating methane, inducing reaction between the methane and a halogen in gaseous state while in direct and intimate contact with aqueous material at approximately 0 degrees C.

15. In the process of halogenating methane, inducing reaction between the methane and a halogen in gaseous state while in direct and intimate contact with ice.

16. In the process of halogenating gaseous, saturated aliphatic compounds free from substituents other than halogen, inducing reaction between said compound and a halogen in gaseous state and maintaining the temperature of the gaseous reacting mixture sufficiently low to limit the extent of the reaction and to remove the halogenated product by condensation thereof, and simultaneously removing the halogen acid produced.

17. In the process of halogenating gaseous, saturated aliphatic hydrocarbons, inducing reaction between said hydrocarbon and a halogen in gaseous state, maintaining the temperature of the gaseous reacting mixture sufficiently low to limit the extent of the reaction and to remove the halogenated product by condensation thereof, and simultaneously removing the halogen acid produced.

18. In the process of halogenating methane, inducing reaction between the methane and a gaseous halogen, maintaining the temperature of the gaseous reacting mixture sufficiently low to limit the extent of the reaction and to remove the halogenated product by condensation thereof, and simultaneously removing the halogen acid produced.

19. In the process of chlorinating gaseous saturated aliphatic hydrocarbons, inducing reaction between the hydrocarbon and chlorin, maintaining the temperature of the gaseous reacting mixture sufficiently low to limit the extent of the reaction and to remove the lower chlorinated products by condensation thereof, and simultaneously removing the halogen acid produced.

20. In the process of chlorinating methane the step which consists in inducing a reaction between methane and chlorin while the reacting gases are in direct and intimate contact with ice.

21. In the process of halogenating saturated gaseous hydrocarbons, inducing reaction between the hydrocarbon and a halogen in gaseous state, causing intimate contact of the reacting mixture with ice in a state of subdivision suitable for controlling the temperature of the reacting mixture and thereby determining the rate of reaction.

22. In the process of chlorinating methane, inducing reaction between methane and chlorin, causing intimate contact of the reacting mixture with ice in a state of subdivision suitable for controlling the temperature of the reacting mixture and thereby determining the rate of reaction.

In testimony whereof I have hereunto set my hand in presence of two subscribing witnesses.

CLAYTON W. BEDFORD.

Witnesses:
H. B. HAMLEN,
A. J. GILHOOLY.